(12) United States Patent
Inagaki et al.

(10) Patent No.: US 7,700,025 B2
(45) Date of Patent: Apr. 20, 2010

(54) MICROPOROUS POLYOLEFIN FILM

(75) Inventors: Daisuke Inagaki, Moriyama (JP); Takahiko Kondo, Yokohama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 12/111,121

(22) Filed: Apr. 28, 2008

(65) Prior Publication Data

US 2008/0290552 A1 Nov. 27, 2008

Related U.S. Application Data

(62) Division of application No. 10/574,613, filed as application No. PCT/JP2004/013763 on Sep. 21, 2004, now abandoned.

(30) Foreign Application Priority Data

Oct. 27, 2003 (JP) .............................. 2003-366601

(51) Int. Cl.
- *B28B 1/00* (2006.01)
- *B29C 43/00* (2006.01)
- *B29C 61/00* (2006.01)

(52) U.S. Cl. .................. 264/230; 264/41; 264/154; 264/210.4; 264/550; 264/553

(58) Field of Classification Search ............... 264/41, 264/154, 230, 550, 553
See application file for complete search history.

(56) References Cited

U.S. PATENT DOCUMENTS 5,731,074 A * 3/1998 Nishiyama et al. ....... 428/315.9
6,245,272 B1 * 6/2001 Takita et al. ............. 264/210.4

FOREIGN PATENT DOCUMENTS

EP 0 603 500 A1 6/1994

(Continued)

OTHER PUBLICATIONS

Standard for Safety Lithium Batteries, Underwriters Laboratories, Inc., Apr. 26, 1995.

(Continued)

*Primary Examiner*—Khanh Nguyen
*Assistant Examiner*—Carson Gross
(74) *Attorney, Agent, or Firm*—Finnegan, Henderson, Farabow, Garrett & Dunner, L.L.P.

(57) ABSTRACT

A microporous polyolefin film which comprises 5 to 95 wt. % polyethylene (A) having a viscosity-average molecular weight (Mv) of 2,000,000 or higher, a first-melting-peak signal height as determined by DSC (differential scanning calorimetry) of 3.0 mW/mg or higher, a specific surface area of 0.7 $m^2$/g or larger, and an average particle diameter of 1 to 150 µm and 95 to 5 wt. % polyethylene (B) having an Mw of 10,000 to 200,000, excluding 10,000 and 200,000, wherein the ratio of the Mv of the compound (A) to that of the compound (B), (A)/(B), is 10 or higher, the film as a whole has a molecular weight of 300,000 to 1,500,000, and the film has a fuse temperature of 120 to 140° C., a breaking temperature of 150° C. or higher, and a ratio of the piercing strength at 25° C. to the piercing strength at 140° C. of from 0.01 to 0.25.

2 Claims, 1 Drawing Sheet

FOREIGN PATENT DOCUMENTS

| | | |
|---|---|---|
| EP | 1 614 710 A1 | 1/2006 |
| JP | 2-21559 | 1/1990 |
| JP | 2711633 | 10/1997 |
| JP | 11-130899 | 5/1999 |
| JP | 2001-181435 | 7/2001 |
| JP | 3351940 | 9/2002 |
| JP | 2002-367589 | 12/2002 |
| JP | 2003-3006 | 1/2003 |
| JP | 2003-103624 | 4/2003 |
| JP | 2003-217554 | 7/2003 |

OTHER PUBLICATIONS

European Search Report dated Dec. 6, 2006.

* cited by examiner

MICROPOROUS POLYOLEFIN FILM

This is a division of application Ser. No. 10/574,613, filed Apr. 5, 2006, now abandoned which is a § 371 of International Application No. PCT/JP2004/013763, filed Sep. 21, 2004 and claims benefit to JP 2003-366601, filed Oct. 27, 2003, all of which are incorporated by reference.

TECHNICAL FIELD

The present invention relates to a separator used for electrochemical reaction devices such as a battery and a capacitor.

BACKGROUND ART

A microporous polyolefin film is used for a microfiltration membrane, a separator for a battery, a separator for a capacitor, fuel cell material, or a basic material for a functional membrane in which a functional material is filled in the pores to give rise to a new function. When the microporous polyolefin film is used, among these applications, as a separator for a battery, particularly a separator for a lithium ion battery, it is required to have a high piercing strength and a high elongation modulus so as to prevent internal short circuit due to foreign bodies and the like within the battery and to prevent the separator from elongating in the flow direction when wound up to form a battery.

Furthermore, "fuse effect" and "heat resistance" securing the safety of a battery are demanded as well as general physical properties in a separator for a high capacity battery of recent years. The fuse effect is a mechanism for securing the safety of a battery by allowing the separator to melt and form a film for covering electrodes and shutoff the battery when inside of the battery is overheated by overcharged states and the like. In the case of a polyethylene microporous film, it is known that the fuse temperature, namely the temperature at which the fuse effect develops, is almost around 140° C. From a viewpoint of stopping runaway reaction inside the battery as soon as possible, the better it is supposed, the lower the fuse temperature is.

Furthermore, the separator after fused should maintain its shape and have a function of keeping the insulation between the electrodes. This is heat resistance and can be grasped by dividing into film breakage properties and thermal shrinkage properties. For example, safety evaluation standard of battery, which prescribe storing at 150° C. in an oven for 10 minutes, are provided in "Standard for Lithium Batteries" of U.S. standard UL1642 from the requirement of securing the safety of battery at 150° C. In order to achieve this safety standard, it is desirable to allow the separator to maintain its shape by, after fusing the pores to be filled up, preventing the film breakage at 150° C. or more and reducing thermal shrinkage as much as possible. When short-circuit parts where the electrodes contact with each other are caused in the batter by film breakage, thermal shrinkage, particularly thermal shrinkage in the width direction of the wound-up battery body, the battery becomes non-safe, and therefore a separator excellent in such a heat resistance is strongly demanded.

Coexistence of the film breakage resistance and low heat shrinkability are important, and heat resistance of a separator can be high when both of them are satisfied. High strength and low heat shrinkability and high film breakage resistance and low heat shrinkability are, however, incompatible characteristics.

For example, as for the viewpoint of high strength, techniques of increasing the molecular weight of polyethylene for creating highly oriented molecular state or increasing the draw ratio for achieving orientation are generally known. However, such a simple high molecular orientation may cause a high shrinkage stress in a fused state, and, as a result, lowers heat resistance.

Furthermore, several attempts to improve heat resistance while maintaining high strength are also known. For example, Patent Document 1 proposed a microporous film having a high film breakage resistance by extrusion molding polyolefin and a polymer cross-linkable therewith followed by cross-linking treatment, but, to the contrary, relaxation at a high temperature was slow and accordingly it was inappropriate due to remaining strong shrinkage stress. In addition, there was a problem in productivity because a thermal cross-linking treatment step, which incurs a long period of time, was included. Meanwhile, Patent Document 2 realized high strength by using a polyolefin having a sharp molecular weight distribution, but it was difficult to have low temperature fuse and high short-circuit ability because the contents of ultra-high-molecular-weight ingredients and low molecular weight ingredients are decreased.

Patent Document 3 discloses a microporous film composed of a polyethylene having a molecular weight of 300,000 or less and a polyethylene having a molecular weight of 1,000,000 or more. However, there is no description in Patent Document 3 about necessity of a step for imparting strength to the microporous film to be heat drawn, that is, a step of drawing the sheet under heating before removing a good solvent, and therefore, it is difficult to obtain a highly strong film. Besides, a step of fusing polyethylenes having a large difference in molecular weight needs a significant period of time and lacks in productivity.

Patent Document 4 discloses a microporous film composed of a polyolefin having a molecular weight of 1,000,000 to 15,000,000 and a polyolefin having a molecular weight of 10,000 to less than 500,000. What is specifically disclosed is, however, a microporous film composed of a polyethylene having a molecular weight of 2,000,000 and a polyethylene having a molecular weight of 350,000 with the molecular weight ratio less than 10. In addition, a microporous film of low thermal shrinkage is obtained in the production method of a microporous film by containing a specific heat-treatment step as an essential step. However, thermal shrinkage was not sufficiently prevented only by the heat-treatment step as described for a microporous film comprising a polyethylene having a molecular weight of 200,000 or less.

Similarly, Patent Document 5 discloses a microporous film containing 1% or more of an ultra-high-molecular-weight polyethylene having a molecular weight of 700,000 or more and composed of a polyolefin composition having a molecular weight distribution of 10 to 300. What is specifically disclosed is, however, a composition composed of a polyethylene having a molecular weight of 2,500,000 and a polyethylene having a molecular weight of 240,000, and does not contain a low molecular weight ingredient having a molecular weight of 10,000 to 200,000 which is essential to the present invention and it is insufficient in fuse property and relaxation rate.

[Patent Document 1] JP-A-2001-181435
[Patent Document 2] Japanese Patent No. 3,351,940
[Patent Document 3] JP-A-02-21559
[Patent Document 4] JP-A-2003-3006
[Patent Document 5] Japanese Patent No. 2,711,633

DISCLOSURE OF THE INVENTION

Problems to be Solved by the Invention

An object of the present invention is to solves the above described problems by using a composition comprising an ultra-high-molecular-weight polyethylene having a specific average particle size, melting behavior and a specific surface area and a polyethylene having a molecular weight of 10,000 to less than 200,000, and to provide a separator having both low fuse and high film breakage properties, and besides low heat-shrinkability at a high temperature.

Means to Solve the Problems

The present inventors have conducted intensive studies to achieve the purposes mentioned above, and consequently have found that a microporous film can be imparted with low fuse and high short-circuit properties as well as low heat-shrinkability at a high temperature by using a composition comprising an ultra-high-molecular-weight polyethylene having a specific average particle size, melting behavior and a specific surface area and a polyethylene having a molecular weight of 10,000 to 200,000 and thus have completed the present invention.

That is, the present invention is as follows.

(1) A microporous polyolefin film which comprises 5 to 95 wt % of polyethylene (A) having an Mv of 2,000,000 or more, a first melting-peak signal height as determined by DSC (differential scanning calorimetry) of 3.0 mW/mg or more, a specific surface area of 0.7 m$^2$/g or more, and an average particle size of 1 to 150 μm and 95 to 5 wt % of polyethylene (B) having an Mw of more than 10,000 and less than 200,000, wherein the Mv ratio of the component (A) to the component (B), (A)/(B), is 10 or more, the film as a whole has a molecular weight of 300,000 to 1,500,000, and the film has a fuse temperature of 120 to 140° C., a film breakage temperature of 150° C. or more, and a ratio of the piercing strength at 140° C. to the piercing strength at 25° C. of 0.01 to 0.25.

(2) The microporous polyolefin film according to above (1) wherein the fuse temperature is 120 to 135° C.

(3) The microporous polyolefin film according to above (1) wherein the fuse temperature is 120 to 133° C.

(4) The microporous polyolefin film according to any of above (1) to (3) having a short-circuit temperature of 152° C. or more.

(5) The microporous polyolefin film according to any of above (1) to (4) having a thermal shrinkage starting temperature in a TD direction of 90° C. or more.

(6) The microporous polyolefin film according to above (5) having a thermal shrinkage starting temperature in the TD direction of 100° C. or more.

(7) The microporous polyolefin film according to above (6) having a thermal shrinkage starting temperature in the TD direction of 110° C. or more.

(8) The microporous polyolefin film according to any of above (1) to (7) having a film thickness of 5 to 24 μm.

(9) The microporous polyolefin film according to any of above (1) to (7) having a porosity of 30 to 60%.

(10) The microporous polyolefin film according to any of above (1) to (7) having a 25° C. piercing strength of 3 to 10 N/20 μm.

(11) A process for producing a microporous polyolefin film which has a molecular weight of 300,000 to 1,500,000 as a whole of the film, a fuse temperature of 120 to 140° C., a film breakage temperature of 150° C. or more, and a ratio of the piercing strength at 140° C. to the piercing strength at 25° C. of 0.01 to 0.25, the process comprising kneading a mixture comprising a polyolefin composition comprising 5 to 95 wt % of polyethylene (A) having a viscosity average molecular weight (Mv) of 2,000,000 or more, a first melting-peak signal height as determined by DSC (differential scanning calorimetry) of 3.0 mW/mg or more, a specific surface area of 0.7 m$^2$/g or more and an average particle size of 1 to 150 μm and 95 to 5 wt % of polyethylene (B) having an Mw of more than 10,000 and less than 200,000, wherein the Mv ratio of the component (A) to the component (B), (A)/(B), is 10 or more, with a plasticizer; extruding the kneaded product and then molding the product into a gel-like sheet to cool and solidify the sheet; drawing the resulting gel-like sheet; extracting the plasticizer to dry the sheet; and thermally fixing the film, wherein the thermal fixation step comprises a step of drawing the film in a TD direction after extracting the plasticizer and a subsequent step of thermally shrinking the film in the TD direction with reference to film width after the drawing step.

(12) The process according to above (11), wherein the drawing step is a step of drawing the film after extracting the plasticizer by at least 20% in the TD direction and the thermal shrinkage step is a step of thermally shrinking the film after extracting the plasticizer by at least 10% in the TD direction with reference to the film width after the drawing step.

Advantages of the Invention

The microporous film consisting of a specific ultra-high-molecular-weight polyethylene and a low molecular weight polyethylene in a specific molecular weight range of the present invention enables to provide a separator having excellent low fuse and high short-circuit properties as well as a low heat-shrinkability at a high temperature.

BEST MODE FOR CARRYING OUT THE INVENTION

Figure 1A:
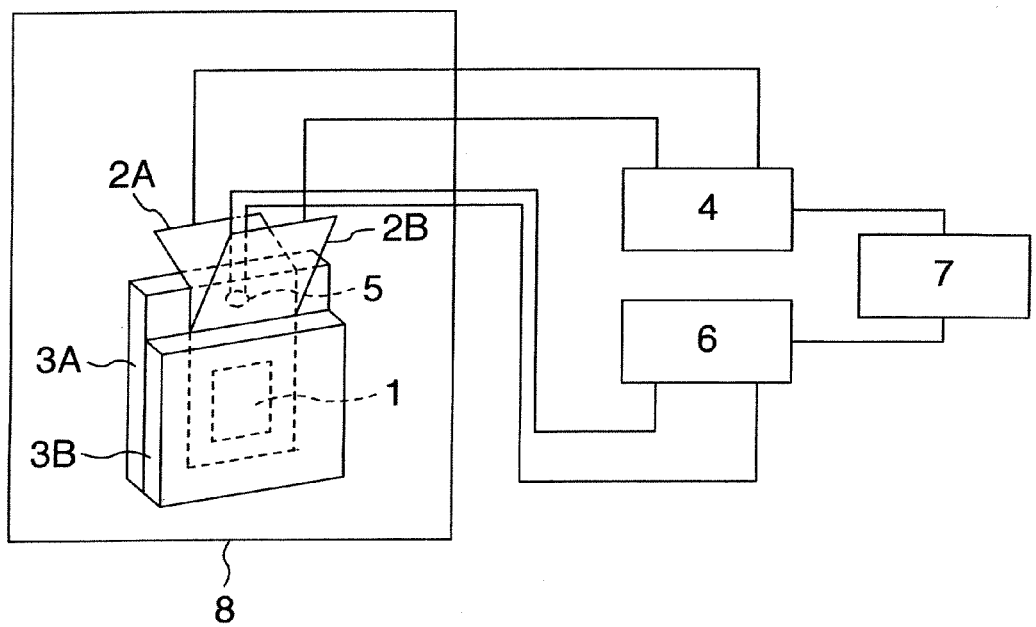
FIG. 1A is a schematic view of a cell for measuring fuse temperature and short-circuit temperature.

The microporous film of the present invention comprises a composition comprising 5 to 95 wt % of an ultra-high-molecular-weight polyethylene with Mv of 2,000,000 or more having an average particle size of 1 to 150 μm, a melting peak signal difference as determined by DSC of 3.0 mW/mg or more and a specific surface area of 0.7 m$^2$/g or more, and 95 to 5 wt % of a low molecular weight polyethylene with Mw more than 10,000 and less than 200,000.

The reason why the microporous film of such a composition is deeply relevant to fuse properties and heat resistance is that the ultra-high-molecular-weight component in the composition is responsible for the strength preventing the film from permeating into the electrodes and the like when fused while the low molecular weight component develops a property of relaxing the thermal shrinkage (relaxation rate) of the oriented microporous film at the time of fusion as fast as possible and low fuse property.

As a polyethylene constituting a composition having such properties, a composition having specific molecular weight components can be mentioned. That is, it is a composition adjusted to comprise a component derived from an ultra-high-molecular-weight polyethylene with a molecular weight of 2,000,000 or more and a component derived from a low molecular weight polyethylene with a molecular weight of more than 10,000 and less than 200,000. In order to attain such a composition, it is essential that Mv of the ultra-highmolecular-weight polyethylene (A) to be blended is 2,000,000 or more, preferably 2,000,000 to 6,000,000 and more preferably 2,000,000 to 4,000,000. When Mv is less than 2,000,000, the components more than 10,000,000 are too few and the film breakage resistance is insufficient, and when it is more than 10,000,000, it becomes difficult to perform sufficient kneading at the extruding step.

The ultra-high-molecular-weight polyethylene (A) should have a first melting-peak signal height as determined by DSC (differential scanning calorimetry) of 3.0 mW/mg or more, an average particle size of 1 to 150 μm and a specific surface area in a range of 0.7 m²/g or more.

The first melting-peak signal height as used herein refers to a vertical distance of point C and the first fusion peak point (D) assuming that the point C to be the intersecting point of a straight line connecting the point on the DSC curve at the first fusion starting temperature (onset temperature)−20° C. and the point on the DSC curve at the first fusion ending temperature (offset temperature)+20° C. and a perpendicular line passing the first melting-peak (D).

The range of signal height is preferably not less than 3.0 mW/mg and not more than 5.0 mW/mg. The range of average particle size should be 1 to 150 μm, and 1 to 100 μm is particularly preferable. If it is a minute powder having a particle size less than 1 μm, aggregation between the powder particles is significant so that bridging by the aggregated particles may occur within the polymer feeder or conducting pipes and give rise to troubles and if it is larger than 150 μm, non-molten component of the ultra-high-molecular-weight component tends to remain in the articles.

Furthermore, if the specific surface area of the above polyethylene is more than 0.7 m²/g, the area contacting with the solvent is large even with the same weight, and therefore, solubility significantly improves under the same kneading condition, and consequently the quality of the film improves. When an ultra-high-molecular-weight polyethylene having such properties is used, the quality of the film can be drastically improved in the melt kneading of polyethylenes having a large difference in molecular weight.

The other approaches such as extention of the kneading time, increase in the kneading temperature and preliminary heat mixing in an autoclave can be generally adopted to attain similar effects, they may result in decrease in productivity and deterioration of the resin, etc. and therefore they are not favorable.

Furthermore, although clear analysis has not been performed, the microporous film using ultra-high-molecular-weight polyethylene which has small particle size and shows such melting behavior results in a high film breakage temperature and high strength at room temperature. This is supposed to be attributable to uniform kneading and dispersing of an ultra-high-molecular-weight component with which the other polyethylene components with medium/low molecular weight may effectively entangle. In addition, because there are few microscopically non-molten parts of the ultra-high-molecular-weight component, interface fracture and generation of cracks from around the non-molten gel scarcely occur when it is subjected to a tension test and the like at room temperature, which is supposed to increase the strength.

Examples of ultra-high-molecular-weight polyethylene satisfying such a condition include those having particles in the shape of a bunch of grapes. The "shape of a bunch of grapes" as used herein refers to a shape in which the whole particle has a spherical shape having a number of convexo-concave regions and resembles a bunch of grapes, and each of them can be discerned by magnifying around 50 to 100 times with a microscope. It can be observed as a confetto-shaped morphology or the like depending on the particle size and enlarged magnification. Because such a shape as mentioned above has a large contacting area in a solvent, melting behavior tends to become sharp. Such a polyethylene may be classified with a sieve or the like in order to obtain particularly fine particles.

Meanwhile, it is essential that Mw of polyethylene (B) for having a component with a molecular weight of 200,000 or less to be contained is more than 10,000 and less than 200,000 more preferably 50,000 to 150,000. When Mw is 200,000 or more, low fuse property and early relaxation property at a high temperature are insufficient, and when it is 10,000 or less, the molecular weight is too low, and the film breakage resistance tends to be insufficient.

The molecular weight ratio of above polyethylene (A) to (B), (A)/(B), should be 10 or more and particularly preferably 20 or more. If this ratio is smaller than 10, it becomes difficult to provide fuse and short-circuit properties in good balance.

Furthermore, the molecular weight of the whole composition including above polyethylene (A) and (B) should be 300,000 to 1,500,000 or more, preferably 350,000 to 1,000,000 and more preferably 400,000 to 800,000. If the molecular weight is smaller than 300,000, it is hard to secure sufficient viscosity when the separator is fused. When the molecular weight exceeds 1,500,000, viscosity at the time of fusion is high, but relaxation rate at a high temperature tends to be insufficient and film breakage tends to be caused by its own shrinkage stress.

The other polyolefin can be mixed in the range that the performance of the composition may not be impaired. The other polyolefin is not particularly limited, and for example, α-polyolefin such as polypropylene, polymethylpentene, polybutene ethylene/propylene copolymer and wax components with a molecular weight of around 1,000 to 4,000. It is preferable that the composition consists of above polyethylene (A) and (B) in order to allow the properties of the present invention to be developed in good balance.

Characteristics of the present invention as a microporous film are as follows.

It is required that the fuse temperature is 120 to 140° C., more preferably 120 to 135° C. and particularly preferably 120 to 133° C. from the viewpoint of working temperature and safety of a battery. When the fuse temperature is less than 120° C., the pores tend to be occluded at a battery drying step and the like, which is not preferable.

It is required that the film breakage temperature is more than 150° C. from the viewpoint of safety of a battery. It is hard to develop sufficient heat resistance in 150° C.-battery oven test and the like if it is lower than 150° C. In addition, the film breakage temperature is preferably 152° C. or more, and particularly preferably 155° C. or more in the recent battery oven test which becomes more and more severe year by year.

It is essential that the ratio of piercing strength at 140° C. and piercing strength at 25° C. is 0.01 to 0.25, more preferably 0.01 to 0.20 and still preferably 0.01 to 0.15 from the viewpoint that it is as strong as possible at normal temperature in consideration of handling properties, and shrinkage stress is relaxed as much as possible at the time of fusion. The normal 25° C. piercing strength is preferably 3 to 10N/20μ from the viewpoint of breaking resistance when the battery is wound up and prevention of defective products by short-circuit between the electrodes.

The microporous film of the present invention can be obtained by, for example, a production process comprising the following steps (a) to (d) and if required (e):

(a) kneading a mixture comprising polyolefin and a plasticizer;

(b) extruding the kneaded product and molding it into a gel-like sheet to cool and solidify the sheet;

(c) drawing the resulting gel-like sheet;

(d) extracting the plasticizer after drawing; and (e) thermally fixing the resulting microporous film.

In the present invention, if, for example, polyolefin used for above step (a) may be a homopolymer of ethylene, a copolymer of ethylene and propylene, 1-butene, 4-methyl-1-pentene, 1-hexene and/or 1-octene, or even a mixture of the above polymers as long as the polyolefin has the above properties (A) or (B). From the viewpoint of the performance of the porous film, a homopolymer of ethylene and a copolymer thereof are preferable.

The plasticizer as used herein is an organic compound which can form a homogenous solution with polyolefin at a temperature equal to or less than the boiling point, and specifically included are decalin, xylene, dioctyl phthalate, dibutyl phthalate, stearyl alcohol, oleyl alcohol, decyl alcohol, nonylalcohol, diphenyl ether, n-decane, n-dodecane, paraffin oil and the like. Of these, paraffin oil, dioctyl phthalate are preferable. The ratio of plasticizer is not particularly limited, but 20 wt % or more is preferable from the viewpoint of porosity of the obtained film, and 90 wt % or less is preferable from the viewpoint of viscosity. More preferably it is from 50 wt % to 70 wt %.

In the above step (b), the above polyolefin composition and a plasticizer may be supplied to, for example, an extruder and after it is melt kneaded at around 200° C., the kneaded product may be extruded and cast from a normal hanger coating die onto a cooling roller adjusted to a temperature lower than the crystallization temperature and thereby enabling to produce a gel-like sheet continuously.

The temperature of the kenaded product is preferably in a range of 150 to 300° C. The thickness of the gel-like sheet depends on draw ratio and the thickness of the microporous film in the final stage, but 0.1 to 3 mm is preferable. The temperature at which the kenaded product is extruded and cooled is preferably 10 to 130° C.

In the above step (c), the drawing step of a gel-like sheet is performed at least once before extracting the plasticizer. As for the drawing, simultaneous biaxial drawing by a tenter method is preferable. The drawing temperature is normal temperature to the melting point of polyolefin, preferable 80 to 150° C., and more preferably 100 to 140° C. The draw ratio is preferably 4 to 400 times, more preferably 10 to 200 times in terms of area ratio from the viewpoint of securing sufficient strength as a separator. If the draw ratio is equal to or less than 4 times, strength as a separator is insufficient, and if is more than 400 times, drawing is difficult to perform, and besides, adverse effects tend to occur such that porosity of the obtained microporous film is low.

Next in step (d), step of extracting a plasticizer, the drawn film obtained in step (c) is immersed in an extracting solvent and then dried sufficiently.

The extracting solvent used in the present invention is poor a solvent for polyolefin and a good solvent for plasticizer and the boiling point thereof is desirably lower than the melting point of polyolefin. Examples of such an extracting solvent include hydrocarbons such as n-hexane and cyclohexane, halogenated hydrocarbons such as methylene chloride and 1,1,1-trichloroethane, alcohols such as ethanol and isopropanol and ketones such as acetone and 2-butanone. The extracting solvent may be selected from these, and solely used or mixed and used.

Then heat fixation is performed in step (e) if required. In the thermal fixation step, the film after extraction of plasticizer is drawn once in MD or TD direction using monaxial drawing machine and simultaneous biaxial drawing machine, and then the shrinkage stress is relaxed by allowing the film to be shrinked. It is particularly important to provide a heat fixation step in the TD direction because the electrodes tend to come into contact and cause short-circuit when the separator shrinks in the TD direction in a battery. It is preferable that draw ratio in the TD direction at this time is more than 20% and preferably more than 40% and particularly preferably it is drawn by as much as more than 60%. When the draw ratio is equal to or less than 20%, thermal shrinkage rate tends to be large particularly in a microporous film containing a low fuse component. After the drawing, shrinkage is performed in the direction reverse to the drawing. It is preferable that the shrink ratio at this time is more than 10% and preferably more than 20%, and particularly preferably it is shrinked by as much as more than 30% with reference to the width at the time of drawing. When the shrink ratio is equal to or less than 10%, heat fixation tends to be insufficient.

This heat fixation step enables to improve TD-TMA shrinkage starting temperature of the film defined later. The TD-TMA shrinkage starting temperature is preferably 90° C. or more, more preferably 100° C. or more, and particularly preferably 110° C. or more. If the TD-TMA shrinkage starting temperature is lower than 90° C. the film tends to shrink in the TD direction when the battery is heated up in a battery drying step before filling the liquid and in battery safety testing and the like.

The microporous polyolefin film obtained by the above-mentioned process can be subjected to surface treatments such as plasma irradiation, impregnation or coating of surfactant and surface grafting as required.

The film thickness of the microporous film in the present invention is preferably 1 to 500 μm, more preferably 5 to 200 μm and still more preferably 5 to 24 μm. If the above film thickness is less than 1 μm, mechanical strength of the film is not necessarily sufficient, and if it is more than 500 μm, there may be problems in reducing the size and weight of a battery. Preferably, the porosity is 20 to 80% and more preferably 30 to 60%. If the porosity is less than 20%, permeability is not necessarily sufficient, if it is more than 80%, sufficient mechanical strength may not be obtained.

The present invention is specifically described by means of Examples and Comparative Example as follows, but these do not limit the range of the present invention. Various physical properties used in the present invention were measured based on the following testing methods.

(1) Mv

Molecular weight was measured by the measurement of Mv for polyethylene having a molecular weight more than 1,000,000. Measurement was performed with a solvent (decalin) at a measurement temperature of 135° C. and Mv was calculated from viscosity [η] by the following formula:

$$[\eta]=6.77\times10^{-4} Mv^{0.67} \quad \text{(Chiang's equation)}$$

(2) DSC Measurement (Differential Scanning Calory Analysis)

DSC60 manufactured by Shimadzu Corporation was used for the measurement.

Six to 7 mg of sample was placed in an aluminum pan (SEIKO Instruments Co., Ltd., SSC000E032 and SSC000E030) and DSC measurement was performed from room temperature to 200° C. under a nitrogen gas flow with a temperature increasing rate of 10° C./min. Point C is defined as the intersecting point of a straight line connecting the point on the DSC curve at the fusion starting temperature (onset temperature)−20° C. and the point on the DSC curve at the fusion ending temperature (offset temperature)+20° C. and a perpendicular line passing the fusion peak point (D). The vertical distance between Point C and the fusion peak point (D) was read as the signal height of the first fusion peak.

(3) Average Particle Size

The sample was magnified 50 to 100 times with an optical microscope, 20 particles diameter were taken at random and the average was determined. When the particle shape was in the shape of an oval, the average of those along the longer axis and the shorter axis was used.

(4) Specific Surface Area

A specific surface area measuring apparatus ASAP-2400 manufactured by Shimadzu Corporation was used for the measurement.

About 2 g sample was taken in a standard cell and degasification was performed at 60° C. for four hours. Then, the measurement was performed by multi-point method (BET method).

(5) GPC

As for the polyethylene having a molecular weight less than 1,000,000, molecular weight was measured by GPC (the value determined by Mv can be also used.)

The measurement was performed with ALC/GPC150C type manufactured by Waters Company (trademark) under the following conditions and the calibration curve was prepared using standard polystyrene. The molecular weight distribution curve in terms of polyethylene was obtained by multiplying 0.43 (Q factor of polyethylene/Q factor of polystyrene=17.7/41.3 of Q factor/polystyrene) on each molecular weight component of these.

Column: 2×GMH$_6$-HT (trademark)+2×GMH$_6$-HTL (trademark) manufactured by Tosoh Mobile phase: o-dichlorobenzene Detector: Differential index detector Flow rate: 1.0 ml/min Column temperature: 140° C.

Sample concentration: 0.1 wt %

(6) Fuse Short-Circuit Temperature (° C.)

A schematic view of an apparatus for measuring fuse temperature is shown in FIG. 1A. Numeral 1 refers to a microporous film, numerals 2A and 2B refer to nickel foils with a thickness of 10 μm, numerals 3A and 3B refer to glass plates. An electrical resistance measuring apparatus 4 (LCR meter "AG-4311" (trademark) manufactured by Ando Electrics Company) is connected to the nickel foils 2A, 2B. Thermocouple 5 is connected to thermometer 6. Data collector 7 is connected to electrical resistance device 4 and thermometer 6. Oven 8 heats a microporous film.

Figure 1B:
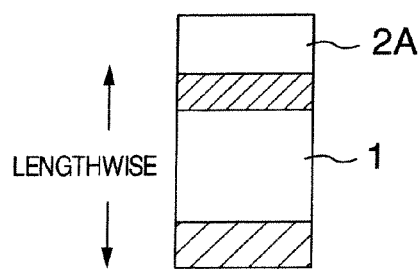
FIG. 1B shows nickel foil 2A.
Figure 1C:
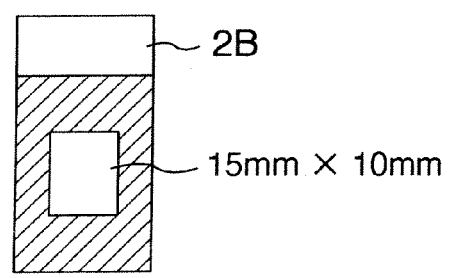
FIG. 1C shows nickel foil 2B.

To described in more detail, microporous film 1 is stacked on nickel foil 2A as shown in FIG. 1B and fixed to nickel foil 2A with a "Teflon" (trademark) tape (hatched part in the drawing) in lengthwise. Microporous film 1 is impregnated with a 1 mol/liter solution of lithium borofluoride (solvent: propylene carbonate/ethylene carbonate/γ-butyrolactone=1/1/2) as an electrolyte. A "Teflon" (trademark) tape (hatched part in the drawing) is attached on nickel foil 2B as shown in FIG. 1C, which is masked leaving a part of a window of 15 mm×10 mm at the central part of foil 2B.

Nickel foil 2A and nickel foil 2B are stacked on top of one another as sandwiching microporous film 1 and the two pieces of nickel foil were further sandwiched with glass plates 3A, 3B from the both sides. The porous film 1 and a part of a window of foil 2B come to the position where they are opposite to each other.

The two pieces of glass plates are fixed by picking them up with a commercial double clip. Thermocouple 5 is fixed on the glass plate with a "Teflon" (trademark) tape.

Temperature and electrical resistance are measured with such a device continuously. Temperature is elevated at rate of 2° C./min from 25° C. to 200° C., and electrical resistance value is measured with an alternating electric current of 1 kHz. The fuse temperature is defined as a temperature when electrical resistance value of the microporous film reaches $10^3 \Omega$. In addition, the film breakage (short-circuit) temperature is defined as a temperature when electrical resistance value decreases to less than $10^3 \Omega$ again after fusion.

(7) Piercing Strength Ratio

Piercing strength at normal temperature: Piercing test was performed with "KES-G5 handy compression test device" (trademark) manufactured by Kato Tech Co., Ltd. under the conditions of curvature radius at the needle point of 0.5 mm, piercing rate of 2 mm/sec, at 25° C. and the maximum piercing load (N) was measured. This is referred to as 25° C. piercing strength.

Piercing strength at elevated temperature: A polyethylene microporous film was sandwiched with two pieces of stainless washers having an inner diameter of 13 mm and an outer diameter of 25 mm, clamped with in clips at four points in the circumference and then immersed in a silicone oil (Shin-Etsu Chemical: KF-96-10CS) at 140° C. and the piercing strength was measured by a similar technique in the case of normal temperature 60 seconds later. This is referred to as 140° C. piercing strength.

The piercing strength ratio is expressed by the following formula:

Piercing strength ratio=140° C. piercing strength/25° C. piercing strength (8) TD-TMA Shrinkage Starting Temperature The measurement was performed with TMA50 (trademark) manufactured by Shimadzu Corporation. Samples cut out in the TD direction with a width of 3 mm were fixed on a holding device so that the distance between the holding devices became 10 mm and set in a specially made probe. The initial load was set to 0.0098N (1.0 g) and the probe was heated up from 30° C. to 200° C. at a rate of 10° C./min, and the temperature was measured where shrinkage force of 0.0118N (1.2 g) or more occurred. This is referred to as TD-TMA shrinkage starting temperature.

(9) Film grade

The amount of unfused substances larger than 100 μm contained in 10 cm×10 cm of the microporous film was measured. When it was 1 piece/100 cm$^2$ or more, the grade was assumed as x (bad) and the grade was assumed as ○ (good) in the case less than 1 piece.

EXAMPLES

Examples are shown below to explain the present invention in detail, but the present invention is not particularly limited to the following Examples.

Example 1

A mixture of 7.5 parts by weight of ultra-high-molecular-weight polyethylene (UHMwPE) with Mv of 2,000,000 (average particle size: 120μ, signal height by DSC: 3.1 mW/mg, specific surface area: 1.0 m²/g), 4.5 parts by weight of HDPE with Mw of 700,000, 9 parts by weight of HDPE with Mw of 300,000, 9 parts by weight of linear copolymerized high density polyethylene with Mw of 150,000 (comonomer: propylene, content: 0.6 mol %) and 70 parts by weight of liquid paraffin was kneaded at 200° C. for 10 minutes using a small kneading machine. Then, the kenaded product was sandwiched with metal plates and rapidly cooled in the shape of a sheet. This rapidly cooled sheet-shaped resin was heat pressed until the sheet thickness became 1.0 mm and biaxially drawn to 7×7 times by length and breadth at a temperature of 120° C. Subsequently, it was subjected to solvent removing treatment with methylene chloride and a microporous film was obtained. Physical properties of the obtained microporous film are shown in Table 1.

Example 2

A mixture of 7.5 parts by weight of ultra-high-molecular-weight polyethylene (UHMwPE) with Mv of 3,000,000 (average particle size: 35μ, signal height by DSC: 3.8 mW/mg, specific surface area: 1.3 m²/g), 22.5 parts by weight of linear copolymerized high density polyethylene with Mw of 150,000 (comonomer: propylene, content: 0.6 mol %) and 70 parts by weight of liquid paraffin was kneaded at 200° C. for 10 minutes using a small kneading machine. Then, the kneaded product was sandwiched with metal plates and rapidly cooled in the shape of a sheet. This rapidly cooled sheet-shaped resin was heat pressed until the sheet thickness became 1.0 mm and biaxially drawn to 7×7 times by length and breadth at a temperature of 120° C. Subsequently, it was subjected to solvent removing treatment with methylene chloride and a microporous film was obtained. Physical properties of the obtained microporous film are shown in Table 1.

Example 3

The microporous film obtained in Example 2 was drawn in the TD direction at 110° C. with a tenter by 25% and subsequently allowed to be thermally relaxed at 115° C. by 15% with reference to the width after the above drawing.

Physical properties of the obtained microporous film are shown in Table 1.

Example 4

The microporous film obtained in Example 2 was drawn in the TD direction at 110° C. with a tenter by 45% and subsequently allowed to be thermally relaxed at 115° C. by 20% with reference to the width after the above drawing.

Physical properties of the obtained microporous film are shown in Table 1.

Example 5

The microporous film obtained in Example 2 was drawn in the TD direction at 110° C. with a tenter by 15% and subsequently allowed to be thermally relaxed at 115° C. by 10% with reference to the width after the above drawing.

Physical properties of the obtained microporous film are shown in Table 1.

Example 6

A microporous film was obtained in the same procedure as in Example 1 except that a mixture of 7.5 parts by weight of ultra-high-molecular-weight polyethylene (UHMwPE) with Mv of 2,700,000 (average particle size: 115 μm, signal height by DSC: 3.7 mW/mg, specific surface area: 0.7 m²/g), 22.5 parts by weight of linear copolymerized high density polyethylene with Mw of 150,000 (comonomer: propylene, content: 0.6 mol %) and 70 parts by weight of liquid paraffin was used. Subsequently, the obtained microporous film was drawn in the TD direction at 110° C. with a tenter by 45% and subsequently allowed to be thermally relaxed at 115° C. by 20% with reference to the width after the above drawing.

Physical properties of the obtained microporous film are shown in Table 1.

Example 7

A microporous film was obtained in the same procedure as in Example 1 except that a mixture of 3 parts by weight of ultra-high-molecular-weight polyethylene (UHMwPE) with Mv of 2,700,000 (average particle size: 115 μm, signal height by DSC: 3.7 mW/mg, specific surface area: 0.7 m²/g), 27 parts by weight of linear copolymerized high density polyethylene with Mw of 150,000 (comonomer: propylene, content: 0.6 mol %) and 70 parts by weight of liquid paraffin was used. Subsequently, the obtained microporous film was thermally fixed under the same conditions as in Example 6.

Physical properties of the obtained microporous film are shown in Table 1.

Example 8

A microporous film was obtained in the same procedure as in Example 1 except that a mixture of 10 parts by weight of ultra-high-molecular-weight polyethylene (UHMwPE) with Mv of 2,700,000 (average particle size: 115μ, signal height by DSC: 3.7 mW/mg, specific surface area: 0.7 m²/g), 20 parts by weight of linear copolymerized high density polyethylene with Mw of 150,000 (comonomer: propylene, content: 0.6 mol %) and 70 parts by weight of liquid paraffin was used. Subsequently, the obtained microporous film was thermally fixed under the same conditions as in Example 6.

Physical properties of the obtained microporous film are shown in Table 1.

Example 9

A microporous film was obtained in the same procedure as in Example 1 except that a mixture of 3 parts by weight of ultra-high-molecular-weight polyethylene (UHMwPE) with Mv of 4,500,000 (average particle size: 30 μm, signal height by DSC: 3.5 mW/mg, specific surface area: 1.2 m²/g), 27 parts by weight of HDPE with Mw of 70,000 and 70 parts by weight of liquid paraffin was used. Subsequently, the obtained microporous film was drawn in the TD direction at 115° C. with a tenter by 60% and subsequently allowed to be thermally relaxed at 120° C. by 20% with reference to the width after the above drawing.

Physical properties of the obtained microporous film are shown in Table 1.

Comparative Example 1

A microporous film was obtained in the same procedure as in Example 1 except that a mixture of 7.5 parts by weight of ultra-high-molecular-weight polyethylene (UHMwPE) with Mv of 3,000,000 (average particle size: 170 μm, signal height by DSC: 3.7 mW/mg, specific surface area: 0.8 m²/g), 22.5 parts by weight of linear copolymerized high density polyethylene with Mw of 150,000 (comonomer: propylene, content: 0.6 mol %) and 70 parts by weight of liquid paraffin was used.

Physical properties of the obtained microporous film are shown in Table 1.

Comparative Example 2

A microporous film was obtained in the same procedure as in Example 1 except that ultra-high-molecular-weight polyethylene (UHMwPE) with Mv of 3,000,000 (average particle size: 120 μm, signal height by DSC: 2.8 mW/mg, specific surface area: 0.7 m$^2$/g) was used in place of the ultra-high-molecular-weight polyethylene (UHMwPE) used in Comparative Example 1.

Physical properties of the obtained microporous film are shown in Table 1.

Comparative Example 3

A microporous film was obtained in the same procedure as in Example 1 except that a mixture of 30 parts by weight of HDPE with Mv of 300,000 and 70 parts by weight of liquid paraffin was used.

Physical properties of the obtained microporous film are shown in Table 1.

Comparative Example 4

A microporous film was obtained in the same procedure as in Example 1 except that a mixture of 30 parts by weight of ultra-high-molecular-weight polyethylene (UHMwPE) with Mv of 2,000,000 (average particle size: 115 μm, signal height by DSC: 3.7 mW/mg, specific surface area: 0.7 m$^2$/g) and 70 parts by weight of liquid paraffin was used.

Physical properties of the obtained microporous film are shown in Table 1.

Comparative Example 5

A microporous film was obtained in the same procedure as in Example 1 except that a mixture of 25 parts by weight of ultra-high-molecular-weight polyethylene (UHMwPE) with Mv of 1,000,000, 15 parts by weight of HDPE with Mv of 300,000 and 60 parts by weight of liquid paraffin was used.

Physical properties of the obtained microporous film are shown in Table 1.

Comparative Example 6

A microporous film was obtained in the same procedure as in Example 1 except that a mixture of 5 parts by weight of ultra-high-molecular-weight polyethylene (UHMwPE) with Mv of 3,000,000 (average particle size: 35 μm, signal height by DSC: 3.8 mW/mg, specific surface area: 1.3 m$^2$/g), 1 part by weight of HDPE with Mv of 200,000 and 94 parts by weight of liquid paraffin was used.

Physical properties of the obtained microporous film are shown in Table 1.

Comparative Example 7

A microporous film was obtained in the same procedure as in Example 1 except that a mixture of 9 parts by weight of ultra-high-molecular-weight polyethylene (UHMwPE) with Mv of 3,000,000 (average particle size: 30 μm, signal height by DSC: 3.5 mW/mg, specific surface area: 1.2 m$^2$/g), 21 part by weight of HDPE with Mv of 300,000 and 70 parts by weight of liquid paraffin was used.

Physical properties of the obtained microporous film are shown in Table 1.

Comparative Example 8

The microporous film obtained in Example was drawn in the TD direction at 115° C. with a tenter by 20% and subsequently allowed to be thermally relaxed at 120° C. by 5% with reference to the width after the above drawing.

Physical properties of the obtained microporous film are shown in Table 1.

Comparative Example 9

A microporous film was obtained in the same procedure as in Example 1 except that a mixture of 2 parts by weight of ultra-high-molecular-weight polyethylene (UHMwPE) with Mv of 3,000,000 (average particle size: 30 μm, signal height by DSC: 3.5 mW/mg, specific surface area: 1.2 m$^2$/g), 13 part by weight of HDPE with Mv of 240,000 and 85 parts by weight of liquid paraffin was used.

Physical properties of the obtained microporous film are shown in Table 1.

TABLE 1

| | Molecular weight of PE | Example 1 | Example 2 | Example 3 | Example 4 | Example 5 | Example 6 | Example 7 | Example 8 | Example 9 | Comparative Example 1 |
|---|---|---|---|---|---|---|---|---|---|---|---|
| Composition (%) | 70,000 | — | — | — | — | — | — | — | — | 27 | — |
| | 150,000 | 9 | 22.5 | 22.5 | 22.5 | 22.5 | 22.5 | 27 | 20 | — | 22.5 |
| | 200,000 | — | — | — | — | — | — | — | — | — | — |
| | 240,000 | — | — | — | — | — | — | — | — | — | — |
| | 300,000 | 9 | — | — | — | — | — | — | — | — | — |
| | 700,000 | 4.5 | — | — | — | — | — | — | — | — | — |
| | 1,000,000 | — | — | — | — | — | — | — | — | — | — |
| | 2,000,000 | 7.5 | — | — | — | — | — | — | — | — | — |
| | 3,000,000 | — | 7.5 | 7.5 | 7.5 | 7.5 | 7.5 | 3 | 10 | — | 7.5 |
| | 4,500,000 | — | — | — | — | — | — | — | — | 3 | — |
| | Liquid paraffin | 70 | 70 | 70 | 70 | 70 | 70 | 70 | 70 | 70 | 70 |
| Characteristics of | Average particle size of ultra-high-molecular-weight PE (μm) | 120 | 35 | 35 | 35 | 35 | 115 | 115 | 115 | 30 | 170 |

TABLE 1-continued

|  |  |  |  |  |  |  |  |  |  |  |
|---|---|---|---|---|---|---|---|---|---|---|
| ultra-high-molecular-weight PE | Signal height of first melting-peak (mW/mg) | 3.1 | 3.8 | 3.8 | 3.8 | 3.8 | 3.7 | 3.7 | 3.7 | 3.5 | 3.7 |
|  | Specific surface area (m²/g) | 1.0 | 1.3 | 1.3 | 1.3 | 1.3 | 0.7 | 0.7 | 0.7 | 1.2 | 0.8 |
| Heat fix condition | TD draw ratio (%) | — | — | 25 | 45 | 15 | 45 | 45 | 45 | 60 | — |
|  | TD relaxation ration (%) | — | — | 15 | 20 | 10 | 20 | 20 | 20 | 30 | — |
| Physical Properties of film | Molecular weight of film (×10⁴) | 51 | 48 | 48 | 48 | 48 | 47 | 32 | 120 | 46 | 48 |
|  | Film thickness (μm) | 20 | 20 | 18 | 18 | 16 | 20 | 20 | 20 | 17 | 18 |
|  | Porosity (%) | 47 | 47 | 42 | 41 | 44 | 48 | 46 | 45 | 46 | 46 |
|  | Piercing strength at 25° C. (N) | 4.8 | 6.2 | 6.0 | 6.2 | 5.8 | 5.9 | 5.0 | 6.6 | 4.5 | 4.6 |
|  | Piercing strength at 140° C. (N) | 0.75 | 0.19 | 0.15 | 0.16 | 0.16 | 0.18 | 0.15 | 0.60 | 0.05 | 0.18 |
|  | Piercing strength ratio | 0.16 | 0.03 | 0.03 | 0.03 | 0.03 | 0.03 | 0.03 | 0.09 | 0.01 | 0.04 |
|  | TD-TMA starting temperature (° C.) | 63 | 60 | 92 | 110 | 85 | 100 | 108 | 115 | 112 | 65 |
|  | Film grade factor | ○ | ○ | ○ | ○ | ○ | ○ | ○ | ○ | ○ | x |
|  | Fuse temperature (° C.) | 135 | 132 | 132 | 132 | 132 | 131 | 130 | 135 | 131 | 131 |
|  | Short-circuit temperature (° C.) | 155 | 160 | 160 | 160 | 160 | 159 | 152 | 162 | 156 | 155 |

|  | Molecular weight of PE | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Composition (%) | 70,000 | — | — | — | — | — | — | — | — |
|  | 150,000 | 22.5 | — | — | — | — | — | — | — |
|  | 200,000 | — | — | — | — | 1 | — | — | — |
|  | 240,000 | — | — | — | — | — | — | — | 13 |
|  | 300,000 | — | 30 | — | 15 | — | 21 | 21 | — |
|  | 700,000 | — | — | — | — | — | — | — | — |
|  | 1,000,000 | — | — | — | 25 | — | — | — | — |
|  | 2,000,000 | — | — | 30 | — | — | — | — | — |
|  | 3,000,000 | 7.5 | — | — | — | 5 | 9 | 9 | 2 |
|  | 4,500,000 | — | — | — | — | — | — | — | — |
|  | Liquid paraffin | 70 | 70 | 70 | 60 | 94 | 70 | 70 | 85 |
| Characteristics of ultra-high-molecular-weight PE | Average particle size of ultra-high-molecular-weight PE (μm) | 120 | — | 115 | — | 35 | 30 | 30 | 30 |
|  | Signal height of first melting-peak (mW/mg) | 2.8 | — | 3.7 | — | 3.8 | 3.5 | 3.5 | 3.5 |
|  | Specific surface area (m²/g) | 0.7 | — | 0.7 | — | 1.2 | 1.2 | 1.2 | 1.2 |
| Heat fix condition | TD draw ratio (%) | — | — | — | — | — | — | 20 | — |
|  | TD relaxation ration (%) | — | — | — | — | — | — | 5 | — |
| Physical Properties of film | Molecular weight of film (×10⁴) | 46 | 28 | 180 | 62 | 230 | 52 | 52 | 48 |
|  | Film thickness (μm) | 18 | 16 | 23 | 22 | 25 | 26 | 24 | 22 |
|  | Porosity (%) | 47 | 47 | 48 | 48 | 47 | 47 | 42 | 48 |
|  | Piercing strength at 25° C. (N) | 4.7 | 4.0 | 6.7 | 5.5 | 7 | 4.3 | 4.3 | 4.5 |
|  | Piercing strength at 140° C. (N) | 0.14 | 0.01 | 2.10 | 1.20 | 2.30 | 0.68 | 0.68 | 0.70 |
|  | Piercing strength ratio | 0.03 | <0.01 | 0.31 | 0.22 | 0.33 | 0.16 | 0.16 | 0.16 |
|  | TD-TMA starting temperature (° C.) | 70 | 98 | 55 | 80 | 55 | 60 | 85 | 75 |
|  | Film grade factor | x | ○ | ○ | ○ | ○ | ○ | ○ | ○ |
|  | Fuse temperature (° C.) | 132 | 137 | 145 | 141 | 143 | 141 | 141 | 141 |
|  | Short-circuit temperature (° C.) | 155 | 148 | 158 | 149 | 164 | 152 | 152 | 152 |

As is apparent from Table 1, a microporous film comprising ultra-high-molecular-weight polyethylene having a particular average particle size, melting behavior, specific surface area and polyethylene with molecular weight of 10,000 to 200,000 is high-grade and has good fuse, short-circuit properties and high relax properties. In addition, it can be imparted with high thermal shrinkage starting temperature while having a low fuse by providing a specific heat fixation condition.

INDUSTRIAL APPLICABILITY

The separator of the present invention can be suitably used for electrochemical reaction devices such as a battery, a capacitor and a fuel cell.

The invention claimed is:

1. A process for producing a microporous polyolefin film which has a molecular weight of 300,000 to 1,500,000 as a whole of the film, a fuse temperature of 120 to 140° C., a film breakage temperature of 150° C. or more, and a ratio of the piercing strength at 140° C. to the piercing strength at 25° of 0.01 to 0.25, the process comprising kneading a mixture comprising a polyolefin composition comprising 5 to 95 wt % of polyethylene (A) having a viscosity average molecular weight (Mv) of 2,000,000 or more, a first melting-peak signal height as determined by DSC (differential scanning calorimetry) of 3.0 mW/mg or more, a specific surface area of 0.7 m²/g or more and an average particle size of 1 to 150 μm and 95 to 5 wt % of polyethylene (B) having an Mw of more than 10,000 and less than 200,000, wherein the Mv ratio of the component (A) to the component (B), (A)/(B), is 10 or more, with a plasticizer; extruding the kneaded product and then molding the product into a gel-like sheet to cool and solidify the sheet; drawing the resulting gel-like sheet; extracting the plasticizer to dry the sheet; and thermally fixing the film, wherein the thermal fixation step comprises a step of drawing the film in a TD direction after extracting the plasticizer and a subsequent step of thermally shrinking the film in the TD direction with reference to film width after the drawing step.

2. The process according to claim 1, wherein the drawing step is a step of drawing the film after extracting the plasticizer by at least 20% in the TD direction and the thermal shrinkage step of thermally shrinking the film after extracting the plasticizer by at least 10% in the TD direction with reference to the film width after the drawing step.

* * * * *

UNITED STATES PATENT AND TRADEMARK OFFICE
CERTIFICATE OF CORRECTION

PATENT NO. : 7,700,025 B2
APPLICATION NO. : 12/111121
DATED : April 20, 2010
INVENTOR(S) : Daisuke Inagaki et al.

It is certified that error appears in the above-identified patent and that said Letters Patent is hereby corrected as shown below:

In claim 1, column 16, line 57, "at 25° of" should read --at 25° C. of--.

In claim 2, column 18, line 4, "shrinkage step of thermally shrinking" should read --shrinkage step is a step of thermally shrinking--.

Signed and Sealed this

Twenty-ninth Day of June, 2010

David J. Kappos
*Director of the United States Patent and Trademark Office*